United States Patent [19]

Sunderman et al.

[11] Patent Number: 6,144,971

[45] Date of Patent: Nov. 7, 2000

[54] SYSTEM FOR COMPARING AN AGENT ACTIVITY WITH A WORK SCHEDULE

[75] Inventors: Kurt E. Sunderman, Geneva; Richard A. Dallmann, Downers Grove; Walter Rafacz, Burbank; John P. Lenihan, Wheaton, all of Ill.

[73] Assignee: Rockwell International Corp., Milwaukee, Wis.

[21] Appl. No.: 09/219,242

[22] Filed: Jan. 25, 1999

Related U.S. Application Data

[63] Continuation of application No. 07/928,862, Aug. 11, 1992, abandoned.

[51] Int. Cl.[7] .................................. G06F 17/60
[52] U.S. Cl. ................... 707/500; 707/526; 345/335
[58] Field of Search .................. 707/500, 515, 707/526; 345/329, 331, 335; 379/157, 265

[56] References Cited

U.S. PATENT DOCUMENTS

| | | | |
|---|---|---|---|
| 4,763,353 | 8/1988 | Canale et al. | 379/157 |
| 4,843,377 | 6/1989 | Fuller et al. | 340/573 |
| 5,210,789 | 5/1993 | Jeffus et al. | 379/127 |
| 5,299,260 | 3/1994 | Shaio | 379/265 |
| 5,339,392 | 8/1994 | Risberg et al. | 345/333 |
| 5,535,256 | 7/1996 | Manloney et al. | 379/34 |

OTHER PUBLICATIONS

Symantec, TimeLine User Manual, 1990, pp. 3–4 to 3–5, 4–2 to 4–3, 6–2 to 6–23, 8–2, 9–8 to 9–9, 9–16 to 9–17, 11–2 to 11–21, 15–8 to 15–9, 16–2 to 16–19, K–4 to K–7.

*Primary Examiner*—Stephen S. Hong
*Attorney, Agent, or Firm*—Welsh & Katz, Ltd.

[57] ABSTRACT

A schedule adherence system for a plurality of agents having a device (30) for defining a daily work schedule for the agents, a device (30) for determining the actual activity of the agents and comparing the activity of the agents with the work schedule, a device (30) for defining threshold limits for the variance between the actual activity of the agents and the work schedule, and a device (30) for indicating when the variance between the actual activity and the work schedule is an amount greater than the threshold limits.

30 Claims, 18 Drawing Sheets

FIG. 1

SCHEDULE FOR JOHNSON L.          DATE 6/6/91          LAST EDITED 6/6/91 AT 07:52

| TASK NAME | TYPE | START TIME | DURATION (HH:MM) |
|---|---|---|---|
| 1. FIRST SHIFT | WORK | 08:00 | 08:00 |
| 2. MORNING BREAK | BREAK | 10:00 | 00:30 |
| 3. LUNCH | LUNCH | 12:00 | 01:00 |
| 4. AFTERNOON BREAK | BREAK | 15:00 | 00:30 |

FIG. 2

SCHEDULE FOR JOHNSON L.          DATE 6/6/91          LAST EDITED 6/4/91 AT 09:12

| TASK NAME | TYPE | START TIME | DURATION (HH:MM) |
|---|---|---|---|
| 1. GINSU SALES | WORK | 09:00 | 08:00 |
| 2. MORNING BREAK | BREAK | 10:00 | 00:30 |
| 3. LUNCH | LUNCH | 12:00 | 01:00 |
| 4. SUPV. TRAINING | TRAINING | 14:00 | 02:00 |
| 5. AFTERNOON BREAK | BREAK | 15:00 | 00:30 |
| 6. QA CIRCLE | MEETING | 16:30 | 00:15 |
| 7. 2ND SHIFT HELP | OVERTIME | 17:00 | 03:00 |
| 8. EVENING BREAK | BREAK | 17:30 | 00:30 |

FIG. 4

```
AGENT SCHEDULE
┌─ SCHEDULE BY ─────┐
│ ○ AGENT GROUP     │    AGENT LIST [        ▼]
│ ○ INFORMATION GROUP│
│ ○ AGENT NAME      │    CURRENT AGENT [        ]   (OPEN)
│ ○ ALL AGENTS      │
└───────────────────┘
┌─ DAILY SCHEDULE ─────────────────────────────┐
│ DATE [MM-DD-YY]                              │
│      TASK NAME     TYPE    START TIME  DURATION │
│   1                                          │
│   2                                          │
│   3                                          │
│   4                                          │
│   5                                          │
│   6                                          │
│   7                                          │
│   8                                          │
│   9                                          │
│  10                                          │
└──────────────────────────────────────────────┘
(SAVE) (NEXT) (SAVE AS..) (REDISPLAY) (DELETE) (PRINT) (QUIT)
```

FIG. 5

```
SAVE AGENT SCHEDULE AS ...
┌─ SAVE AS ──────────────────────────────┐
│ ┌─ TYPE ──────────┐                    │
│ │ ○ AGENT NAME    │   NAME [        ]  │
│ │ ○ AGENT GROUP   │                    │
│ │ ○ AGENT 1-GROUP │                    │
│ │ ○ ALL AGENTS    │                    │
│ └─────────────────┘                    │
│ ┌─ WEEK ──────────┐ ┌─ DAY ──────────┐ │
│ │ ☒ CURRENT WEEK  │ │ ☐ MONDAY  ☐ FRIDAY   │
│ │ ☐ NEXT WEEK     │ │ ☒ TUESDAY ☐ SATURDAY │
│ └─────────────────┘ │ ☒ WEDNESDAY ☐ SUNDAY │
│                     │ ☐ THURSDAY           │
│                     └─────────────────────┘
│ (OK)                          (CANCEL)  │
└────────────────────────────────────────┘
```

FIG. 6

```
┌─ PRINT AGENT SCHEDULES ──────────────┐
│                                      │
│  ┌─ TYPE ──────────┐                 │
│  │ ○ AGENT NAME    │                 │
│  │ ○ AGENT GROUP   │  NAME ┌──────┐  │
│  │ ○ AGENT 1-GROUP │       └──────┘  │
│  │ ○ ALL AGENTS    │                 │
│  └─────────────────┘                 │
│  ┌─ WEEK ──────────┐ ┌─ DAY ───────┐ │
│  │ ☒ CURRENT WEEK  │ │ ☐ MONDAY    │ │  ☐ FRIDAY
│  │ ☐ NEXT WEEK     │ │ ☒ TUESDAY   │ │  ☐ SATURDAY
│  └─────────────────┘ │ ☒ WEDNESDAY │ │  ☐ SUNDAY
│                      │ ☐ THURSDAY  │ │
│  ┌────┐              └─────────────┘ │  ┌────────┐
│  │ OK │                              │  │ CANCEL │
│  └────┘                              │  └────────┘
└──────────────────────────────────────┘
```

FIG. 7

```
┌─ DELETE AGENT SCHEDULES ─────────────┐
│  ┌─ TYPE ──────────┐                 │
│  │ ○ AGENT NAME    │                 │
│  │ ○ AGENT GROUP   │  NAME ┌──────┐  │
│  │ ○ AGENT 1-GROUP │       └──────┘  │
│  │ ○ ALL AGENTS    │                 │
│  └─────────────────┘                 │
│  ┌─ WEEK ──────────┐ ┌─ DAY ───────┐ │
│  │ ☒ CURRENT WEEK  │ │ ☐ MONDAY    │ │  ☐ FRIDAY
│  │ ☐ NEXT WEEK     │ │ ☒ TUESDAY   │ │  ☐ SATURDAY
│  └─────────────────┘ │ ☒ WEDNESDAY │ │  ☐ SUNDAY
│                      │ ☐ THURSDAY  │ │
│  ┌────┐              └─────────────┘ │  ┌────────┐
│  │ OK │                              │  │ CANCEL │
│  └────┘                              │  └────────┘
└──────────────────────────────────────┘
```

FIG. 10

```
          00000000011111111112222222222333333333344444444445555555555666666666677777777778
          12345678901234567890123456789012345678901234567890123456789012345678901234567890
 1| STATE:  OUTPUT                             ALARMS:              10-23-89 10:23    | 1  STATUS
 2|-------------------------------------------------------------------------------    | 2
 3| GROUP:  GGG    AGENT GROUP SCHEDULE ADHERENCE DISPLAY           [000]             | 3  GENINFO
 4| DIR #   NAME          STATUS       TIME IN STATE    SCHEDULED STATUS              | 4
 5|  1214   L. OWINGS     CALL-WORK    00:01:15         BREAK                         | 5
 6|  1514   HARRISON      SCHEDULED    00:10:20         WORK                          | 6
 7|  1714   JONES         AVAILABLE    00:00:01         MEETING                       | 7
 8| DDDDD   NNNNNNNNNNNN  SSSSSSSSS    TTTTTTTT         WWWWWWWWWWWW                  | 8
 9|                                                                                   | 9
10|                                                                                   |10  WORK
11|                                                                                   |11
12|                                                                                   |12
13|                     WORK WINDOW (USED FOR HELP MESSAGES)                          |13
14|                                                                                   |14
15|                                                                                   |15
16|                                                                                   |16
17|                                                                                   |17
18|                                                                                   |18
19|                                                                                   |19
20| OUTPUT MESSAGES AND COMMAND RESPONSES (1 TO 19 LINES, ENDING AT LINE 21)          |20
21|                                                                                   |21  OUTPUT
22|-------------------------------------------------------------------------------    |22
23| COMMAND>                                                                          |23  INPUT
24|                                                                                   |24
```

G = GROUP NUMBER, 3 CHARACTERS
N = AGENT NAME, 12 CHARACTERS
T = TIME IN STATE, 8 CHARACTERS
D = DIRECTORY NUMBER, 5 CHARACTERS
W = WORK SCHEDULE, 10 CHARACTERS
S = STATUS, 9 CHARACTERS

FIG. 11

```
00000000011111111112222222222333333333344444444445555555555666666666677777777778
12345678901234567890123456789012345678901234567890123456789012345678901234567890
 1| STATE: OUTPUT                              ALARMS:            10-23-89 10:23 | 1 STATUS
 2|----------------------------------------------------------------------------- | 2 -----
 3| GROUP: GGG       AGENT I-GROUP SCHEDULE ADHERENCE DISPLAY        [000]       | 3 GENINFO
 4| DIR #     NAME         STATUS       TIME IN STATE  SCHEDULED STATUS          | 4
 5|  1214     L. OWINGS    CALL-WORK    00:01:15       BREAK                     | 5
 6|  1514     HARRISON     AVAILABLE    00:10:20       LUNCH                     | 6
 7|  1714     JONES        AVAILABLE    00:00:01       OVERTIME                  | 7
 8|  DDDDD    NNNNNNNNNNNN SSSSSSSSS    TTTTTTTT       WWWWWWWWWWWW               | 8
 9|                                                                              | 9
10|                                                                              |10 WORK
11|                                                                              |11
12|                WORK WINDOW (USED FOR HELP MESSAGES)                          |12
13|                                                                              |13
14|                                                                              |14
15|                                                                              |15
16|                                                                              |16
17|                                                                              |17
18|                                                                              |18
19|                                                                              |19
20| OUTPUT MESSAGES AND COMMAND RESPONSES (1 TO 19 LINES, ENDING AT LINE 21)     |20
21|----------------------------------------------------------------------------- |21 OUTPUT
22|                                                                              |22 -----
23| COMMAND>                                                                     |23 INPUT
24|                                                                              |24
```

G = GROUP NUMBER, 3 CHARACTERS
N = AGENT NAME, 12 CHARACTERS
T = TIME IN STATE, 8 CHARACTERS
D = DIRECTORY NUMBER, 5 CHARACTERS
W = WORK SCHEDULE, 10 CHARACTERS
S = STATUS, 9 CHARACTERS

FIG. 12

```
┌─────────────────────────────────────────────────┐
│              REAL TIME DISPLAY          △ ▽    │
│ FILE  EDIT  HELP                                │
│       AGENT GROUP SCHEDULE ADHERENCE DISPLAY    │
│ GROUP ☐                                         │
│                                                 │
│ DIR # NAME STATUS   DIR # NAME STATUS   DIR # NAME STATUS │
│                                                 │
└─────────────────────────────────────────────────┘
```

FIG. 13

```
┌─────────────────────────────────────────────────┐
│              REAL TIME DISPLAY          △ ▽    │
│ FILE  EDIT  HELP                                │
│  AGENT I-GROUP SCHEDULE ADHERENCE DISPLAY W/TIME IN STATE │
│ GROUP ☐                                         │
│                                                 │
│ DIR # NAME STATUS   DIR # NAME STATUS   DIR # NAME STATUS │
│                                                 │
└─────────────────────────────────────────────────┘
```

FIG. 14

REAL TIME DISPLAY

FILE   EDIT   HELP

AGENT GROUP SCHEDULE ADHERENCE DISPLAY W/TIME IN STATE

GROUP

| DIR # | NAME | STATUS | TIME IN STATE | SCHEDULED STATUS |
|---|---|---|---|---|

FIG. 15

REAL TIME DISPLAY

FILE   EDIT   HELP

AGENT I-GROUP SCHEDULE ADHERENCE DISPLAY W/TIME IN STATE

GROUP

| DIR # | NAME | STATUS | TIME IN STATE | SCHEDULED STATUS |
|---|---|---|---|---|

FIG. 16

```
┌─┬──────────────AGENT INFORMATION DISPLAY──────────────┐
│STAFF ID ☐  NAME ☐      DIR NUM ☐      SAT GRP ☐      │
│         LINE STATUS                    ATT AWT NCH   │
│ LINE 1 ☐    TIME ☐         IN-CALLS    ☐   ☐   ☐     │
│ LINE 2 ☐    TIME ☐         OUT-CALLS   ☐   ☐   ☐     │
│ LINE 3 ☐    TIME ☐     POSITION CALLS  ☐   ☐   ☐     │
│ AGENT STATUS ☐     TIME ☐    SIGN-IN DURATION ☐      │
│         AGENT'S SCHEDULE FOR THE CURRENT DAY         │
│                                         [ CANCEL ]  │
└──────────────────────────────────────────────────────┘
```

FIG. 17

```
┌──────────────── REAL TIME DISPLAY ──────────────────┐
│ FILE   EDIT   HELP                                  │
│       AGENT GROUP SCHEDULE ADHERENCE DISPLAY        │
│ GROUP ☐                                             │
│ DIR # NAME  ┌──── AGENT INFORMATION DISPLAY ─────┐  │
│  ☐    ☐     │STAFF ID ☐ NAME ☐ DIR NUM ☐ SAT GRP☐│  │
│  ☐    ☐     │   LINE STATUS          ATT AWT NCH │  │
│  ☐    ☐     │LINE 1 ☐ TIME ☐    IN-CALLS ☐ ☐ ☐   │  │
│  ☐    ☐     │LINE 2 ☐ TIME ☐   OUT-CALLS ☐ ☐ ☐   │  │
│  ☐    ☐     │LINE 3 ☐ TIME ☐ POSITION CALLS ☐ ☐ ☐│  │
│             │AGENT STATUS ☐ TIME ☐ SIGN-IN DURATION☐│
│             │  AGENT'S SCHEDULE FOR THE CURRENT DAY│  │
│             │                        [ CANCEL ]   │  │
│             └──────────────────────────────────────┘  │
└─────────────────────────────────────────────────────┘
```

FIG. 22

```
┌─────────────────────────────────────────────────────────────┐
│ ─ │        SCHEDULE ADHERENCE THRESHOLDS                    │
├───┴─────────────────────────────────────────────────────────┤
│ SAT GROUP LIST  [            ]                              │
│ CURRENT GROUP   [            ]    ( OPEN )                  │
│         ┌─ SA THRESHOLDS ──────────────────────────────┐    │
│         │              ACCEPTABLE DEVIATIONS           │    │
│         │                START            END          │    │
│         │ SCHEDULE TYPE  EARLY LATE    EARLY LATE      │    │
│         │         WORK   [ - ] [ - ]   [ - ] [ - ]     │    │
│         │        BREAK   [ - ] [ - ]   [ - ] [ - ]     │    │
│         │        LUNCH   [ - ] [ - ]   [ - ] [ - ]     │    │
│         │      MEETING   [ - ] [ - ]   [ - ] [ - ]     │    │
│         │     TRAINING   [ - ] [ - ]   [ - ] [ - ]     │    │
│         │     OVERTIME   [ - ] [ - ]   [ - ] [ - ]     │    │
│         │         SICK   [ - ] [ - ]   [ - ] [ - ]     │    │
│         │     VACATION   [ - ] [ - ]   [ - ] [ - ]     │    │
│         │        OTHER   [ - ] [ - ]   [ - ] [ - ]     │    │
│         └──────────────────────────────────────────────┘    │
│  ( SAVE ) ( NEXT ) (SAVE AS..) (DELETE) ( PRINT ) ( QUIT )  │
└─────────────────────────────────────────────────────────────┘
```

FIG. 27

SITE: ANYWHERE USA                                   PRINTED: 08/11/92  01:05 AM
COVERING 08/10/92

| TIME | AGENT NAME | SCHEDULE | ACTUAL | DURATION OF EXCEPTION | SAT GRP |
|---|---|---|---|---|---|
| 8:05 | SALLY SMITH | WORK | OFF-DUTY | 00:25:00 | 2 |
| 9:05 | JOHN DOE | WORK | BREAK | 00:07:15 | 14 |
| 9:05 | SALLY SMITH | BREAK | WORK | 00:10:37 | 2 |
| 10:05 | SALLY SMITH | WORK | BREAK | 00:05:45 | 2 |

FIG. 28

| TASK TYPE | DUTY STATE |
|---|---|
| WORK | ON-DUTY |
| BREAK | OFF-DUTY |
| LUNCH | OFF-DUTY |
| TRAINING | OFF-DUTY |
| MEETING | OFF-DUTY |
| OVERTIME | ON-DUTY |
| SICK | OFF-DUTY |
| OTHER | OFF-DUTY |
| VACATION | OFF-DUTY |

SYSTEM FOR COMPARING AN AGENT ACTIVITY WITH A WORK SCHEDULE

This application is a continuation of U.S. patent application Ser. No. 07/928,862 filed on Aug. 11, 1992, now abandoned.

BACKGROUND OF THE INVENTION

The present invention relates to schedule adherence systems for a plurality of agents.

In the past, agents have been employed in order to carry out procedures pursuant to employment. For example, a plurality of agents or workers may be utilized to place and handle calls in a telephone system. Usually no predefined schedule of activities for the agents have been utilized for their reference or in order to monitor the actual activities of the agents. Further, there has been no satisfactory manner of verifying whether proper times of employment have been carried out, or that tasks have properly been carried out during employment.

In the case of the telephone systems, a supervisor of the agents should be aware of the activities of the agents in order to better allocate the work force. For example, if one agent is late to work or from a break, the supervisor should be informed of this fact in order to reallocate the work force and cover the station of the missing employee. Further, it is useful to the supervisor to be aware of the actual activities of the agent in the event that one or more agents have not properly handled the work which may only become apparent over a prolonged period of time.

SUMMARY OF THE INVENTION

A feature of the present invention is the provision of a schedule adherence system for a plurality of agents.

The system of the present invention comprises, means for defining a daily work schedule for the agents, means for determining the actual activity of the agents and comparing the actual activity of the agents with the work schedule, and means for defining limits for the variance between the actual activity of the agents and the work schedule.

A feature of the invention is the provision of means for indicating when the variance between the actual activity and the work schedule is an amount greater than a threshold limit.

Thus, another feature of the invention is that a supervisor of the agents may readily determine when the work schedules are not being observed by the agents.

Another feature of the invention is that the supervisor may manage the work force in an improved and efficient manner.

Yet another feature of the invention is that the user may eliminate discrepancies in the work schedule by the agents.

Another feature of the invention is that the start times of the agents may be defined by the system.

Still another feature of the invention is that the duration of a task by the agents may be defined in the system.

Yet another feature of the invention is that the indicating means may comprise a display associated with a computer.

Another feature of the invention is that the information may be displayed in real time.

A further feature of the invention is that information about a set of agents may be selected for display.

Another feature of the invention is that information concerning a set of agents may be selected for defining the work schedules.

Still another feature of the invention is that the schedules may be readily modified by the user.

Yet another feature of the invention is that the threshold limits may be readily modified by the user.

Still another feature of the invention is that a current week schedule may be replaced with a next week schedule, and a next week schedule may be replaced with a current week schedule automatically.

Thus, a feature of the invention is that the system greatly simplifies the manner of entering or displaying data concerning the agents.

A further feature of the invention is that information in the schedule may be modified in a simplified manner.

Another feature of the invention is that either one or a group of agents may be selected to determine a schedule or to display information about the schedule.

Yet another feature of the invention is that the display of information may be highlighted when a threshold limit has been exceeded by an agent.

A feature of the invention is that the threshold limits may be defined for both early and late start and end times for each task type.

Another feature of the invention is that an average call talk time may be determined for an agent on a pop up display.

Yet another feature of then invention is that an average call work time may be determined for an agent.

Still another feature of the invention is that the number of calls handled by an agent may be determined by the system.

Further features will become more fully apparent in the following description of the embodiments of this invention, and from the appended claims.

DESCRIPTION OF THE DRAWINGS

In the drawings:

FIG. 1 is a sample schedule for a schedule adherence system of the present invention;

FIG. 2 is another example of a schedule;

FIG. 4 is a plan view of a display for an agent schedule dialog box;

FIG. 5 is a plan view of a display for a Save Agent Schedule As . . . dialog box;

FIG. 6 is a plan view of a display of a print schedule dialog box;

FIG. 7 is a plan view of display of a delete schedule dialog box;

FIG. 10 is a plan view of a display of a Schedule Adherence Real-Time Display (SA RTD) as shown by agent group;

FIG. 11 is a plan view of the SA RTD as shown by agent I-Group;

FIG. 12 is a plan view of a display of the SA RTD by agent group on a personal computer (PC);

FIG. 13 a plan view of a display for the SA RTD as shown by Agent I-Group on a PC;

FIG. 14 is a plan view of a display for the SA RTD by Agent Group on a PC;

FIG. 15 is a plan view of a display for the SA RTD by Agent I-Group on a PC;

FIG. 16 is a plan view of a display for an Agent Information Display;

FIG. 17 is a plan view of a display of the SA RTD by Agent Group showing a pop-up Agent Information Display;

FIG. 22 is a plan view of a display of a schedule adherence threshold dialog box;

FIG. 27 is a sample of a printed schedule deviation report; and

FIG. 28 is a plan view of a task type to duty state mapping.

DESCRIPTION OF THE PREFERRED EMBODIMENTS

Figure 26:
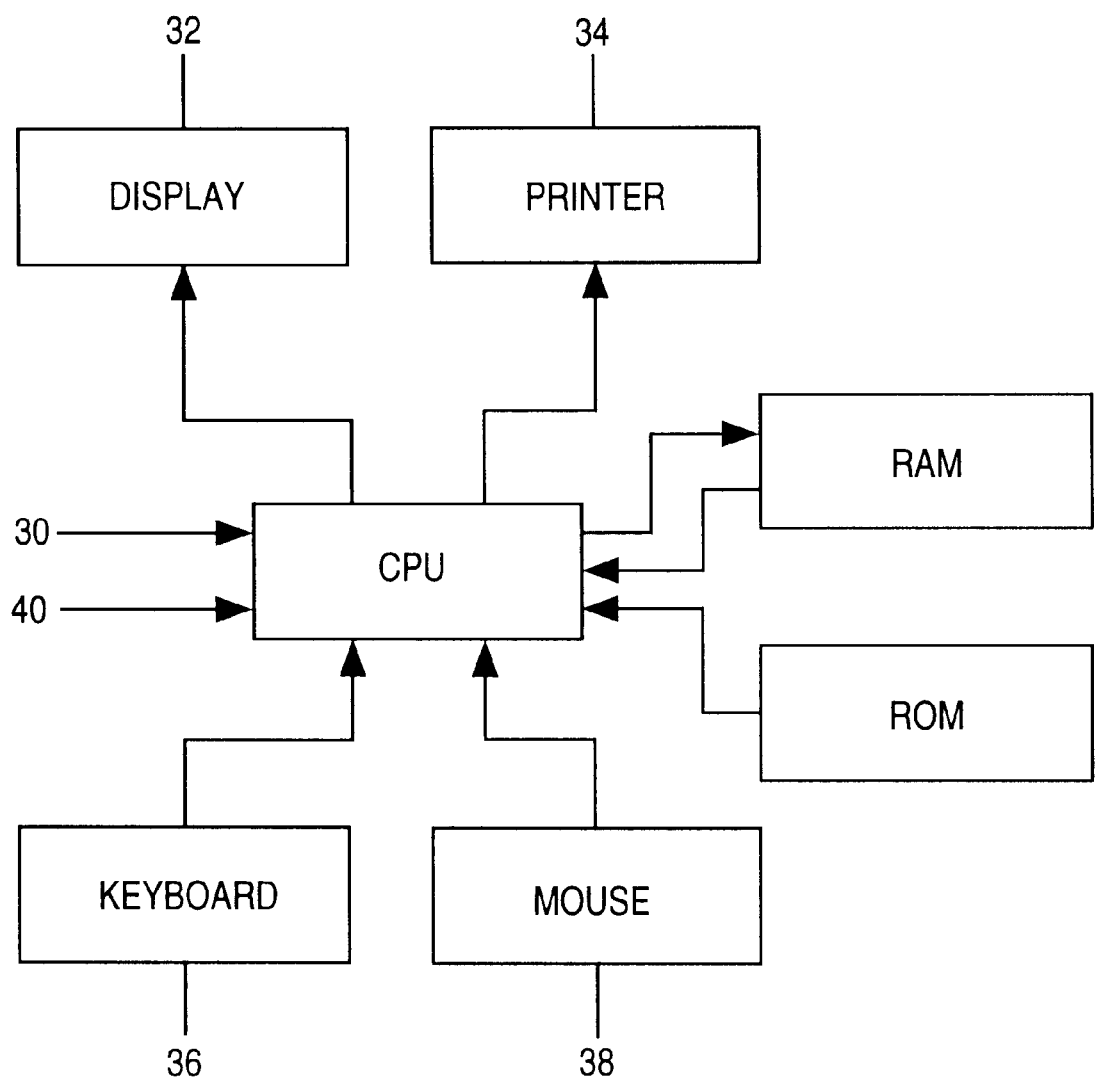
FIG. 26 is a block diagram of the schedule adherence system of the present invention.

Referring now to FIG. 26, there is shown a computer 30 or Central Processing Unit (CPU) having a Random Access Memory (RAM) and Read Only Memory (ROM) which is utilized in connection with a Schedule Adherence System 40, such as a telephone system which handles and routes telephone calls, which is defined by a suitable program in the memory of the computer 30. The computer 30 may also have a suitable display or screen 32 for displaying information from the computer 30, a keyboard 36 for entering information into the computer 30, a mouse 38 for also entering information into the computer 30, and a printer 34 for printing information from the computer 30 or CPU, with said computer 30 having a suitable clock.

The Schedule Adherence program in the computer 30 permits the user, such as a supervisor of a number of agents, to define up to two weeks of daily work schedules for each of a plurality of agents or workers, such as in the telephone system. Once the schedules have been defined, a Schedule Adherence Real-Time Display (SA RTD) informs the user of discrepancies between work schedules of the agents and actual activity of the agents in near real-time. This procedure permits the user to detect schedule problems early, so that the agent work force may be better managed. The Schedule Adherence program comprises the following three features: a user definable agent work schedule, a Schedule Adherence Real-Time Display, and schedule adherence thresholds.

Thus, the Schedule Adherence program permits the user to define daily schedules for their agent work force. Each agent's schedule may contain information for a period of time, such as two weeks. A schedule includes start times and durations for work shift, breaks, and lunch. Additional items such as meetings, training, vacation and sick time may also be scheduled. These schedules are entered and modified by entering data into user friendly dialog boxes. Schedules may be modified at any time, using the same interface employed to define the schedule.

Once a schedule has been defined for an agent, discrepancies between this schedule and the agent's actual activity are highlighted on the Schedule Adherence Real-Time Display (SA RTD). The SA RTD displays the agent's directory number, name and current status (IDLE, CALL-WORK, UNAVAIL, etc.). In addition to the ability to set thresholds on the agent status field, the agent name may be highlighted whenever the agent's status deviates from the agent's daily work schedule. The method of highlighting (color, italics, etc.) as well as "acceptable deviation from Schedule" time thresholds are user definable.

Additional information about the agent may be retrieved by clicking on the agent's name on the display. This will cause a dialog box to be displayed with the following information about the agent:

Agent state,

Time in state,

SAT group,

Line states for lines 1–3,

Time in state for lines 1–3,

Scrollable daily work schedule,

Average call talk times for in-calls, out calls and position calls,

Average call work time for in-calls, out-calls and position calls,

Number of calls handled for in-calls, out-calls and position calls, and

Sign-in duration,

This pop-up Agent Information display is not a real-time display, but is static. The information displayed represents a snapshot of the agent activity when the user clicked on the agent's name. This display is presented as a dialog box, and can therefore be moved around the screen. In addition to displaying information about agent state and average talk and work times, the display includes a scrollable window in which the agent's work schedule for the current day is displayed. While this dialog box is displayed, the SA RTD will continue to update. However, only one Agent Information Display may be displayed at a time.

In order to enter, edit, or print agent schedules, the user first double clicks on an Agent Scheduling Icon in a Command Window by the mouse 38. The procedure will open an Agent Scheduling window. Next, with reference to FIG. 3, the user selects Open from the file menu, which will bring up the Agent Schedule dialog box, as shown in FIG. 4. The user now selects what agents to schedule, which may be an individual agent, all the agents assigned to an agent group or agent information group (i-group), or all agents in the system.

After an agent or group of agents have been selected, the user clicks on the OPEN button next to the Current Agent field. This procedure will activate the Daily Schedule portion of the Agent Schedule dialog box, populating it with the work schedule (if one exists) for the agent listed in the Current Agent field. The current day's schedule is presented, but other days may be displayed or edited by changing the date field which is implemented as a spin button.

The agent's schedule may now be viewed, entered, edited, or printed. Changes are saved to disk by selecting the SAVE button. The current schedule may also be saved to another day, or to another agent or group of agents by selecting the SAVE AS . . . button. This permits the user to reduce data entry by entering a schedule once, and then copy it to all agents with similar schedules.

The current schedule may be printed by selecting the PRINT button on the bottom of the Agent Schedule dialog box. Schedules may also be printed by group, or for all agents by making appropriate menu selection from the print submenu, as shown in FIG. 6.

Figure 3:
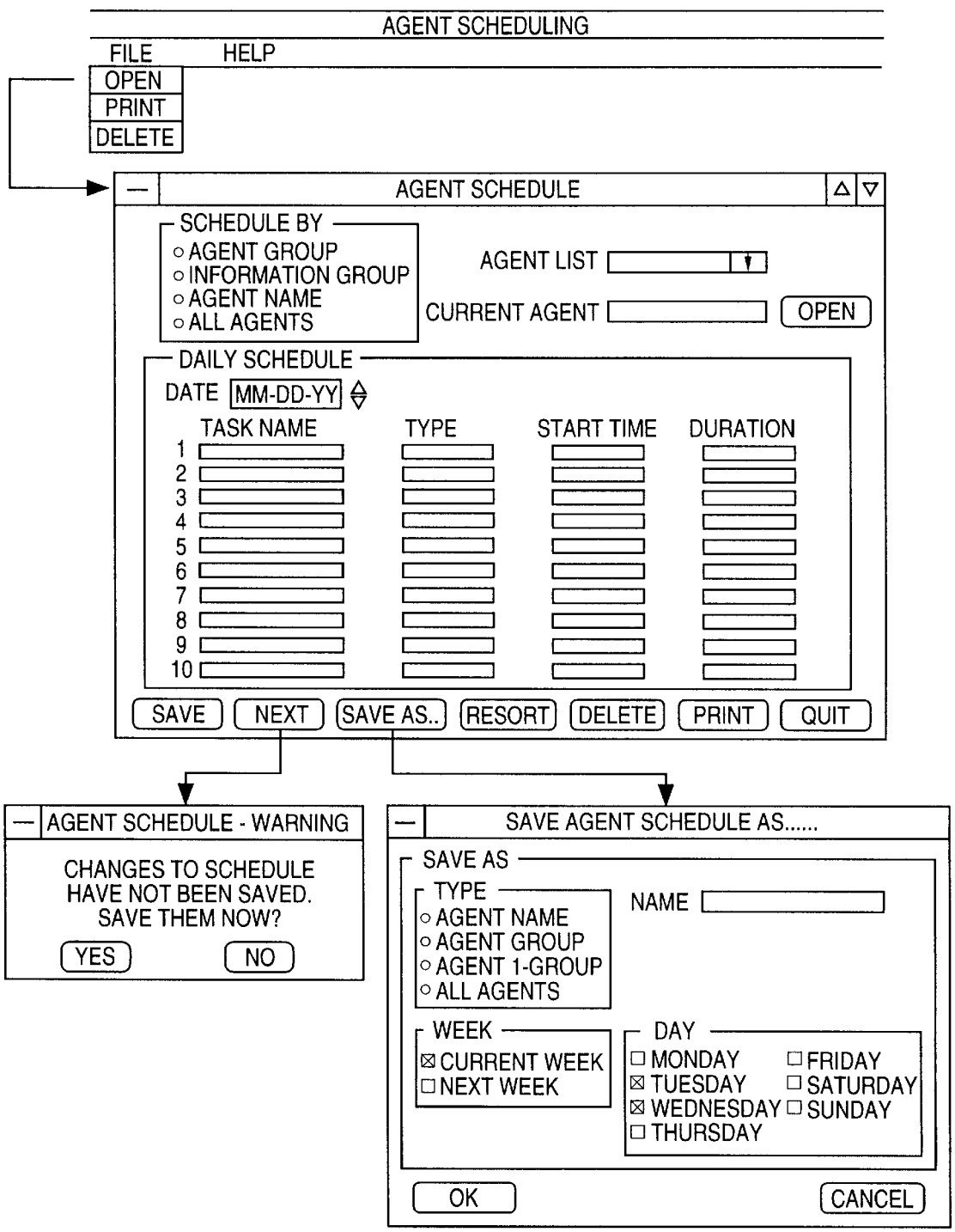
FIG. 3 is a diagrammatic view of a display of agent scheduling for the adherence system of the present invention.

Selecting the NEXT button in FIG. 3 will change the current agent to the next agent in the Agent List and bring up the current days schedule for this agent. This mechanism provides a convenient way to enter or modify schedules for all agents in the same group.

Figure 9:
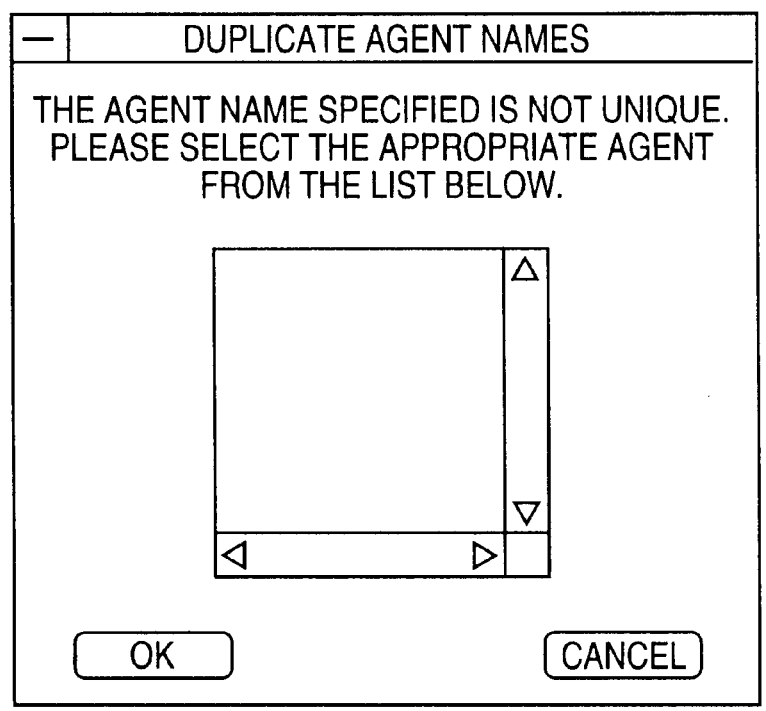
FIG. 9 is a plan view of a display of a duplicate names box.

Since agent names are not required to be unique, if a name or partial name is entered and duplicate names are found to match this string, the user will be presented with a list of names, along with staff-id and extension number in a dialog box. As shown in FIG. 9, the user may now select the appropriate agent from this list.

In order to modify a Schedule Adherence Threshold (SAT) group's schedule adherence thresholds, the user selects SA Thresholds from the Edit menu in the RTD window. The user is then presented with a submenu with entries for Definition and Style. By selecting Definition, the user will then be presented with the Schedule Adherence Thresholds (SAT) dialog box, as shown in FIG. 22. Initially, all but the OPEN and QUIT buttons will be grayed. This procedure will force the user to specify the SAT group or groups for which they wish to enter, modify or view schedule thresholds. Once these have been entered in the SAT Group List field, the user clicks on the OPEN button next to the Current Group field. This procedure will place the first SAT group number (if multiples have been entered) in the Current Group field. The SA (Schedule Adherence) Thresholds portion of the dialog box is activated and populated by the early/late threshold values for the current group. These may now be modified.

Figure 23:
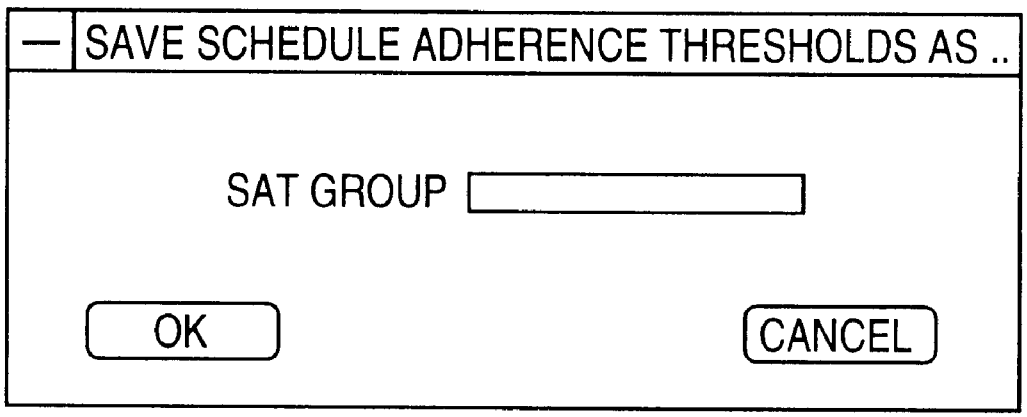
FIG. 23 is a plan view of a display of a save SA Threshold As . . . dialog box.

Changes are saved by selecting the SAVE button. Schedule adherence thresholds may also be saved to another SAT group with the SAVE AS . . . button, as shown in FIG. 23. This procedure allows the user to reduce data entry by entering a set of thresholds once, and then copy it to groups with similar thresholds.

Figure 24:
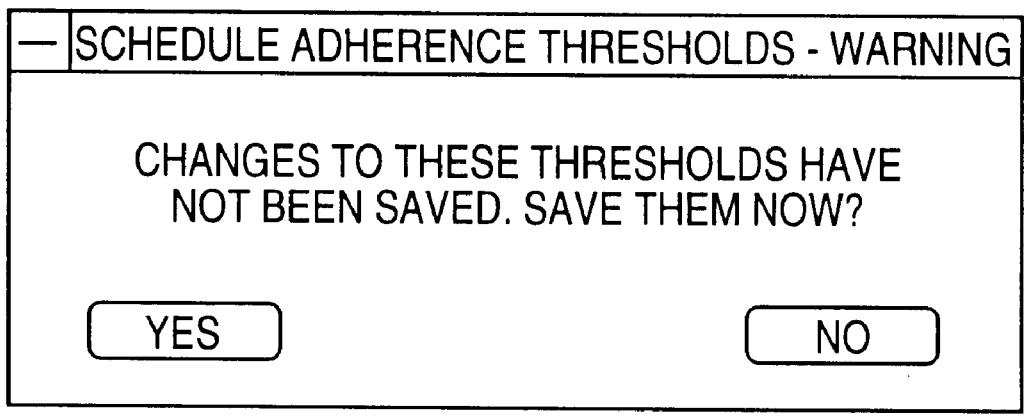
FIG. 24 is a plan view of a display of a schedule adherence warning box.

When the user is done viewing, or editing the SAT group's thresholds, the program may move on to the next group in the SAT Group List by clicking on the NEXT button at the bottom of the dialog box. This procedure will change The Current Group to the next SAT group in the SAT Group List, and display the current schedule adherence thresholds for that group. With reference to FIG. 24, if changes for the previous group have not been saved, the user will be presented with a message box alerting the user of this fact.

Figure 25:
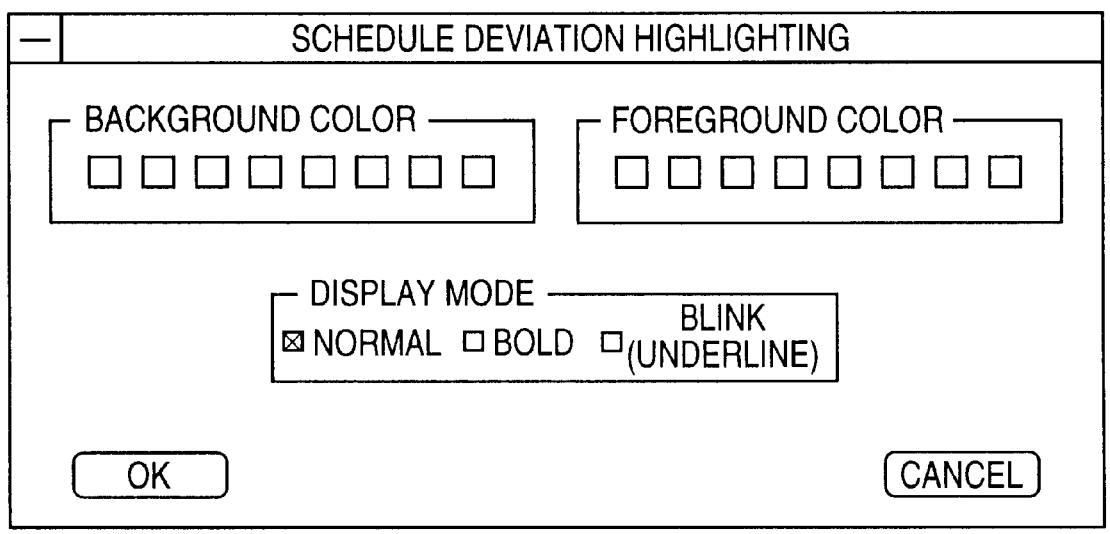
FIG. 25 is a plan view of a display of a define schedule adherence highlighting.

The user may also select the style of highlighting which will be applied to an agent name field of the SA RTD when a schedule deviation is detected. In order to accomplish this result, the user first selects Style from the SA Threshold submenu of the RTD window. As shown in FIG. 25, once this has been completed, the user is presented with a Schedule Deviation Highlight dialog box. This dialog box allows the user to select the foreground color, background color, and display mode which will be applied to the agent name field of a SA RTD when a schedule deviation is detected.

When an agent deviates from his/her schedule it is useful to know this fact immediately. In some cases, prompt action on the part of the supervisor is needed to assure proper staffing for an agent group. For example, an agent returning late from lunch may leave a group understaffed, requiring reassignment of another agent until the tardy agent returns. The Schedule Deviation RTD provides the prompt feedback needed to manage this type of staffing problem.

However, some problems become more fully apparent when schedule deviations are viewed over time, for example an agent who is chronically late for work. By keeping records of schedule deviations, these type of problems are not only easier to detect, but are also documented for future reference. A Schedule Deviation Report may be displayed or printed when desired which may contain this information, as shown in FIG. 27.

In a preferred form, each agent may have up to 14 days of daily schedules stored in the computer. These days are divided into two weeks, referred to as the "current week" and the "next week." At the end of each week (end-of-week is based on a system parameter) at the end-of-day cutoff, the "next week" set of schedules automatically becomes the "current week" schedules, and the previous "current week" schedules become the new "next week" schedules. This automatic carrying forward of schedules greatly reduces the data entry required at sites where agents have similar schedules from week to week.

Each agent's schedule may contain up to ten entries per day, and may include the following information:

Task Name

The task name is a 12 character user defined label for a scheduled task, as shown in FIGS. 1 and 2;

TASK TYPE

Every task in an agent schedule, irrespective of task name, may be one of the following task types: WORK, BREAK, LUNCH, TRAINING, MEETING, OVERTIME, SICK, OTHER, or VACATION. Schedule Adherence thresholds may be defined for each task type. The OTHER type is provided as a "generic" task type for scheduling instances where none of the other off duty types apply;

START TIME

The start time of the task; and

DURATION

The duration of the task.

These schedules may be entered, edited, and printed, as desired.

In order to enter, edit, or print agent schedules, the user must first double click on the Agent Scheduling Icon. This procedure opens the Agent Scheduling window. Next, the user selects Open from the File menu, as shown in FIG. 3. With reference to FIG. 4, this procedure brings up the Agent Schedule dialog box, as previously discussed. Initially, all but the "Schedule by" buttons and the QUIT button will be grayed. This procedure forces the user to specify what agents to schedule. Scheduling must be done for a single agent, a group of agents, or all agents in the system. If scheduling is to be done by group, the user selects the type of group (agent group, or i-group). All groups of this type will appear in a drop-down Group List. The user now selects a group from this drop-down box. The Group List drop-down box will be renamed the Agent List drop-down box and contains a list of all agents in the selected group. The first agent in this list will appear in the Current agent field.

If the user chooses to schedule agents by name rather than group, the user selects the Agent Name button. The Agent List drop-down field will be grayed, and the user simply enters the name of the agent to be scheduled in the Current Agent field of the dialog box and clicks the OPEN button. If the agent name is not unique, all names which match the string entered by the user will appear in a Duplicate Names dialog box, as shown in FIG. 9. In addition to names, staff-ids and extension numbers will be listed to assist the user in selecting the correct agent. Once the user selects the desired agent, the user clicks on the OK button of the dialog box. This procedure will place the desired name in the Current Agent field of the Agent Schedule dialog box. The user may now reselect OPEN to start the editing procedure.

In order to enter/edit the schedules of all agents irrespective of group assignment, the user selects the All Agents button. This procedure will populate the Agent List drop down box with the name of every agent in the system. Clicking on the OPEN button places the first agent name in the Current Agent field and begins the editing process. Due to the potentially long retrieval time associated with getting the names of all agents in the system, the user will be presented with a message box warning of the relatively long delay.

After an agent or group of agents has been selected, the user clicks on the OPEN button next to ten Current Agent field. This procedure will gray the OPEN button, and activate the Daily Schedule portion of the Agent Schedule dialog box. The task name, type, start time, and duration fields will be populated with the current day's work schedule (if one exists) for the agent listed in the Current Agent field. The user may now add, delete or modify schedule entries.

Tasks may be entered into the schedule in any order. Clicking on the REORDER button will redisplay the schedule with entries which are presented in ascending order by start time. A valid entry must have a task type (one of the nine predefined types), start time, and duration. The task name field is optional. Although overlapping schedules are allowed, each task must have a unique start time.

An entire entry (all 4 fields) may be deleted by placing the cursor on the line number to the left of the Task Name filed, and pressing the delete key. Selecting the DELETE button at the bottom of the dialog box will clear all entries currently being displayed (one day). In order to eliminate accidental deletion, a warning message box will be displayed asking the user to confirm the deletion. In order to delete more than the schedule currently being displayed in the Agent Schedule dialog box, the user must select Delete from the File menu. This procedure will present the user with the Delete Schedules dialog box, as shown in FIG. 7. This dialog box allows the user to delete the schedules for a specific agent, all agents in a group (agent group or agent i-group), or all agents in the system. It also allows the user to select which days of the two week schedule to delete. Initially all but the "TYPE" buttons and the CANCEL button will be grayed, forcing the user to specify the type of deletion (by name, agent group, agent i-group, or all agents). Once a deletion type has been selected, the remainder of the box will be ungrayed, and the "name" field will be appropriately labeled (Agent Name, Agent Group, or Agent I-Group). The user then enters the agent(s) or group(s) to delete. The "Week" and "Day" check boxes allow the user to delete anywhere from a single day's worth of schedules to every day in the two week schedule. Initially, these check boxes will default to the current week and day. When deleting schedules by agent name, if the name entered is not unique, the user will be presented with the Duplicate Names dialog box from which the user may select the desired agent. All schedules in the system may be deleted by selecting the All Agents button. If this button is selected, the name field will be grayed.

Changes are saved to disk by selecting the SAVE button. Schedules may also be saved to another day, or to another agent by selecting the SAVE AS . . . button. This allows the user to reduce data entry by entering a schedule once, and then copy it to all agents with similar schedules, as shown in FIG. 5. Initially, all but the "TYPE" buttons and the QUIT button will be grayed, forcing the user to specify the destination of the save (individual agent, agent group, agent i-group, or all agents). Once this has been selected, the remainder of the box will be ungrayed, and the "name" field will be appropriately labeled (Agent Name, Agent Group, or Agent I-Group). The user then enters the agent(s) or group(s) to save the current schedule. The "Week" and "Day" check boxes allow the user to save the current schedule to multiple days. Initially, these check boxes will default to the current week and day. When saving schedules to agents by name, if the name entered is not unique, the user will be presented with the Duplicate Names dialog box from which the user may select the desired agent. A schedule may also be saved to every agent in the system by selecting the All Agents button. If this button is selected, the name field will be grayed.

Figure 8:
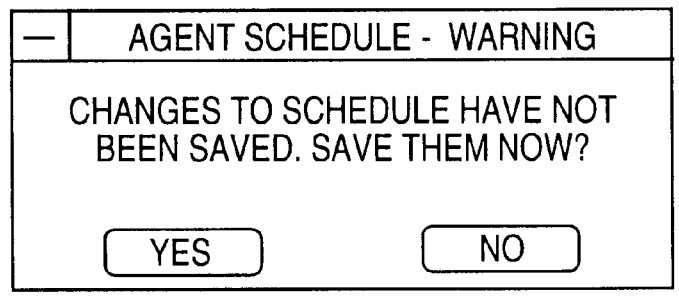
FIG. 8 is a plan view of a display of a warning message box.

Schedules for other days may also be viewed, entered, or edited by changing the date spin button to the desired date. Doing so will bring up the desired schedule in the Daily Schedule portion of the dialog box. If the user has not saved the changes prior to attempting to change the date, the user will be presented with a message box, as shown in FIG. 8. This message box will allow the user to save or cancel changes to the current schedule before another day is presented for editing. Also, days prior to the current date may be viewed, but changes may not be saved (SAVE button will be grayed).

The current schedule may be printed by selecting the PRINT button on the bottom of the Agent Schedule dialog box. Schedules may also be printed by group, or for all agents by selecting Print from the File menu. This procedure will present the user with the Print Agents dialog box, as shown in FIG. 6. The operation of this dialog box is the same as the Delete Agents dialog box previously described. When schedules are printed for multiple agents, they will be sorted alphabetically.

When the user is done viewing, editing, or printing the agent's schedule, the user may move on to the next agent in the Agent List by clicking on the NEXT button at the bottom of the dialog box. This procedure will change the Current Agent to the next agent in the Agent list, and display the current day's schedule for that agent. If changes for the previous agent have not been saved, the user will be presented with a message box alerting the user of this fact, as shown in FIG. 8.

The schedule editing session is terminated by clicking on the QUIT button. If changes to the current schedule have not been saved, the user will be notified via the message box, as shown in FIG. 8, and the user will be given an opportunity to save the changes.

In some cases, two or more tasks overlap in a schedule, the program will allow any schedule task to overlap any or all other tasks. In this regard, it may be considered that the agent's schedule is a series of on and off states. From the perspective of Schedule Adherence, a task is either performed by an on-duty agent (signed-in and plugged-in), or by an off-duty agent (signed-out). A Table showing the mapping of task type to on/off duty states is shown in FIG. 28. When tasks of different duty states overlap, the duty state of the last task to start always has precedence. For example, as shown in FIG. 2, the Afternoon Break, Supervisor Training and Ginsu Sales all overlap. During this overlap, the Schedule Adherence mechanism will expect the agent to be in an off-duty state since the last of these tasks to start is the Afternoon Break.

The definition of a day will be based on logging end-of-day. The definition of week will be based on end-of-week. Both end-of-day and end-of-week are system parameters. A maximum of two weeks of schedule may be maintained on the system, and no historical schedules may be maintained.

Rather than forcing the user to enter new schedules every week, agent schedules are automatically carried forward from week to week, as previously discussed. This procedure greatly reduces the amount of data entry required at most sites. However, since schedules are automatically carried forward, this procedure can help mask the fact that schedules for some agents have not been updated for the new week. In order to help highlight this type of user error, the agent schedule contains "last updated" time and date which will print on the first line of the schedule. If an agent's schedule has not been updated, the appearance of this date in both printed schedules and in the Agent Work Schedule window of the pop-up Agent Information Display should highlight the error to the user.

Since agent scheduling can be done by i-group, creating i-groups which contain agents with similar schedules can greatly simplify the scheduling task. For example, a site may have a group of agents with very similar schedules, perhaps all working the same shift, a supervisor need only enter one schedule, and then copy it to all members of the i-group.

The internal representation of agent work schedules are reconstructed every day shortly before the end-of-day boundary. While this rebuilding process is occurring (approximately 20 minutes), schedule updates, threshold changes, anD SATGRP changes will be rejected. A scheduled task should not span an end-of-day boundary.

Agent work schedules are needed to take full advantage of the Schedule Adherence RTD. The currently scheduled task appears on the main display of the SA RTD, as well as in the pop-up Agent Information Display. If no task is scheduled for an agent, these fields will be left blank. Additionally, schedule deviations can not be detected if schedules have not been defined.

The Schedule Adherence Real-Time Display is composed of two parts: a real-time display and an auxiliary pop-up Agent Information Display. The purpose of the main display is to present the user with the typical agent status information (directory number, name, and status). The Agent Information Display contains detailed information about the agent, including detailed status information, cumulative agent statistics, and the agent's daily work schedule.

Typically, a supervisor will monitor a group of agents via the SA RTD's main display. If additional information about an agent is desired, for example, because a field in the display is highlighted (indicating a user defined threshold has been exceeded by an agent), the supervisor can call up the Agent Information Display with a simple click of the mouse 38. The components of the Schedule Adherence Real-Time Display are described below.

The format of the Schedule Adherence RTDs is shown in FIGS. 10 and 11. For each agent, their directory number, name, and status (current state) is displayed. The time in state and scheduled status usually available on the Agent Information Display are also displayed.

The format of the Schedule Adherence RTDs is shown in FIGS. 12–15. Two variations of the Schedule Adherence RTD is supported. One of these only includes the agent's directory number, agent name, and current state, as shown in FIGS. 12 and 13. This display is equivalent to the Agent Status with Agent Name Display, but with support for the pop-up Agent Information Display. A further version containing the directory number, agent name, current status, time in current state, and scheduled status is also supported, as shown in FIG. 14.

With reference to FIG. 16, the Agent Information Display is a dialog box which contains information about the agent at the moment the display was requested. The information in this display is set forth as follows:

Staff Id;

Name (full 12 characters);

Directory Number;

SAT Group Number;

Detailed Line Status (line states and times for all 3 lines);

Agent Status;

Time in Current State (HH:MM:SS format);

Average Call Talk Time (ATT) for In-Calls, Out-Calls and Position Calls (for the current signed-in period);

Average Call Work Time (AWT) for IOn-Calls, Out-Calls, and Position Calls (for the current signed-in period);

Number of Calls Handled (NCH) for In-Calls, Out-Calls, and Position Calls (for the current signed-in period);

Sign-in Duration (HH:MM:SS format); and

Current daily work schedule in a scrollable window.

Unlike the main display, the Agent Information Display is not a real-time display. The information in this display is fixed at the moment the Agent Information Display is requested.

The user may activate the Schedule Adherence RTD by selecting Open from the File menu of the RTD Window, or by entering an ACT-RTD command. In either case, the user may then select either an agent or an agent i-group display. All agents which are a member of the selected group will be displayed if they meet one of the following criteria:

1. Agent is currently signed in; or
2. Agent is currently scheduled to be on-duty.

If the Agent is not signed-in, but is scheduled to be on-duty, the agent will be added to the display, and his/her state will reflect the sign-out reason selected by the agent when they last signed-out.

The user may activate the Agent Information Display for any agent on the display by double clicking the left mouse button while the mouse pointer is positioned on the agent's name. This procedure will cause a dialog box to pop-up, overlaying a portion of the main display, as shown in FIG. 17. This dialog box may be moved, but will remain on top of the RTD Window until the CANCEL button is selected via the mouse 38.

The personal statistics on the Agent Information Display is derived from agent performance data which is only available when the agent is signed-in. Thus, these field will be zero if the Agent Information Display is for a currently signed-out agent.

The time-in-state for the agent's overall status will be presented in an HH:MM:SS format. Since this format only supports durations up to 100 hours, a row of asterisks (* * *) will be displayed if an agent stays in a state longer than 100 hours. This case could occur for signed-out states like ENDDUTY or VACATION.

The Schedule Adherence RTD indicates to the user whenever an agent has deviated from their daily work schedule by a user specified amount of time by highlighting the agent's name on the display. The schedule adherence threshold mechanism allows the user to define both the style of highlighting, such as color and blink, and the amount of time an agent may deviate from their schedule.

In order to simplify the management of Schedule Adherence thresholds, each agent will be assigned to a Schedule Threshold Group (SAT group) when they are added to the system. Schedule Adherence thresholds will then be associated with the SAT groups. This procedure permits the user to have up to 128 different sets of schedule thresholds. This procedure allows each supervisor to assign a unique set of schedule thresholds to the group of agents they manage. This procedure also permits a site to apply special thresholds to certain members of their staff. For example, a SAT group for handicapped employees might be created with more lenient thresholds. Similarly, a SAT group with very small thresholds might be created to scrutinize new employees.

Since the agents on an SA RTD may be members of different SAT groups and therefore have different schedule thresholds, the SAT group number is shown in the pop-up Agent Information display, as shown in FIG. 16, as well as in the Schedule Deviation Report.

Figure 18:
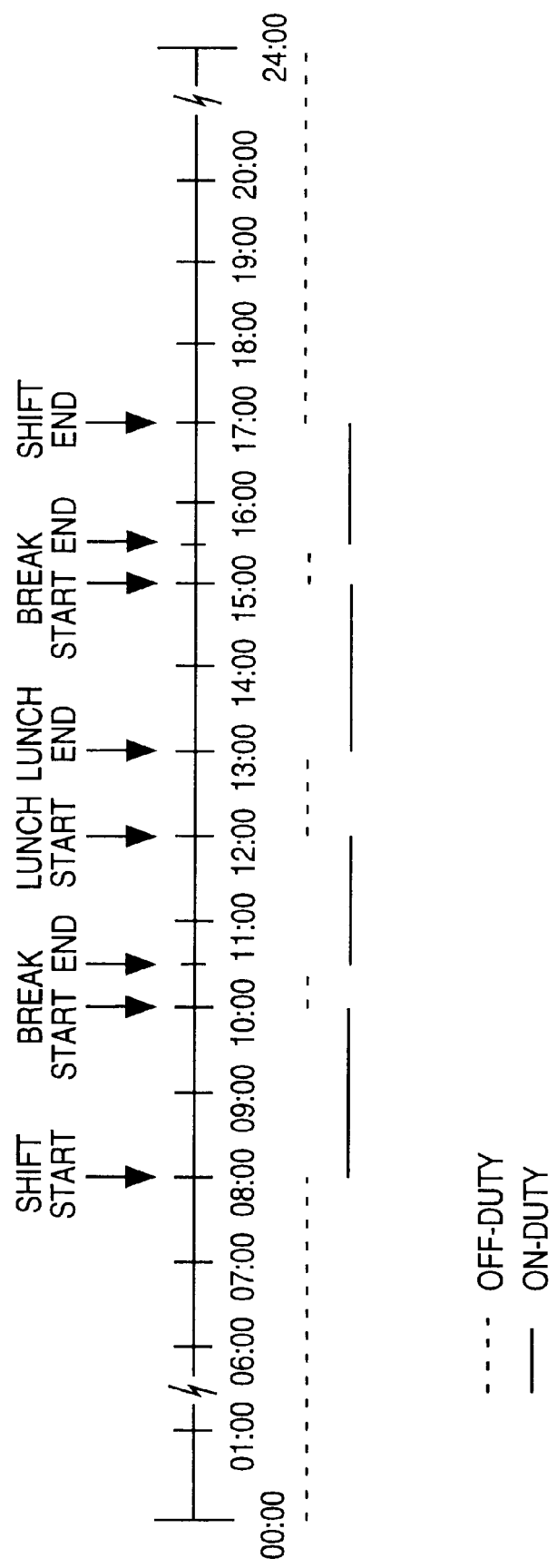
FIG. 18 is a diagram showing an agent schedule time line for the schedule adherence system of the present invention.

An agent's schedule comprises a sequence of on and off-duty states, as shown in FIG. 18. The schedule adherence mechanism continuously compares an agent's current state against their daily work schedules. If an agent is scheduled to be on-duty, but is not signed-in, they are added to the appropriate Schedule Adherence RTD(s), and the agent's name is highlighted to indicate that the agent has deviated from the schedule.

Figure 19:
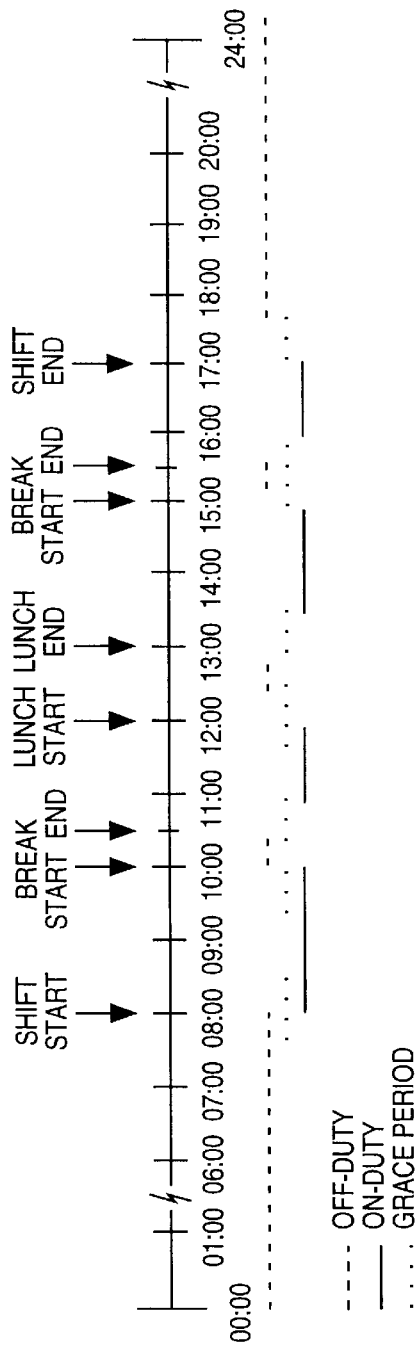
FIG. 19 is a diagram showing an agent schedule time line with schedule adherence thresholds.

It is usually not desirable to highlight the agent name field on the SA RTD for every schedule deviation. In most situations, a certain amount of deviation is acceptable around transition points within an agent's schedule. The supervisor is most interested in those agents who are exceptionally early or late. In order to accomplish this result, the user may define an early and late threshold for each task type in the daily work schedule. These thresholds comprise grace periods in which an agent may deviate from their schedule without being reflected on a SA RTD, as shown in FIG. 19.

Figure 20:
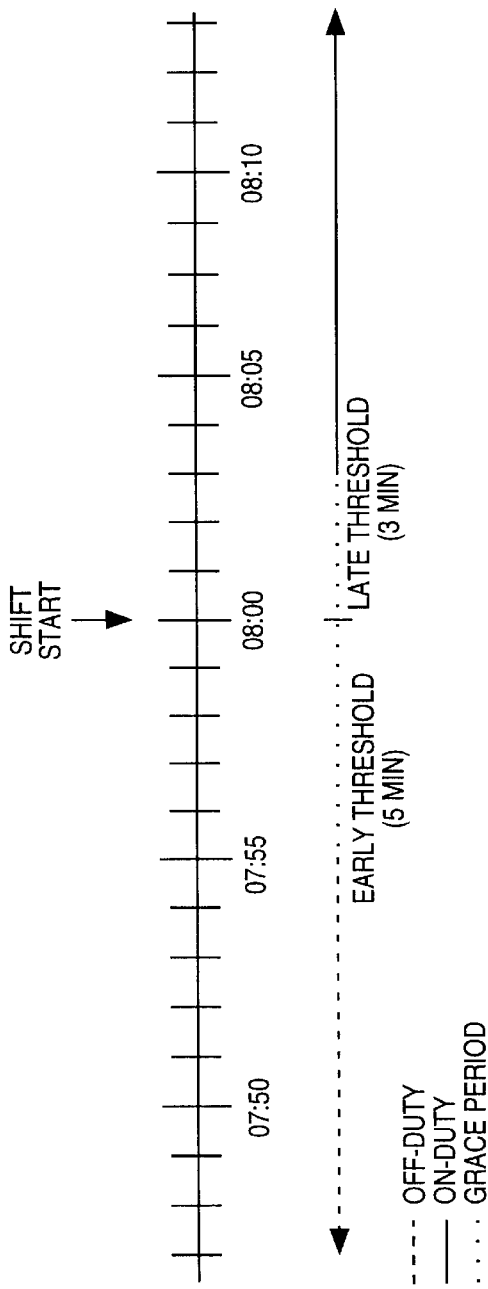
FIG. 20 is a diagram of schedule adherence thresholds associated with a shift start.

FIG. 20 shows a close-up view of an agent's schedule in time line form. The agent is scheduled to start work at 8:00 am. An early threshold of 5 minutes and a late threshold of 3 minutes has been associated with the shift start. This information has the affect of creating an 8 minute "grace period" surrounding the start of the shift. During this grace period, the agent may sign-in or sign-out without triggering a schedule adherence threshold. In this example, sign-ins prior to 7:55 am will cause the agent to be added to the appropriate SA RTD(s) with the agent name field highlighted to indicate that the agent has deviated an exceptional amount from their schedule. If the agent signs-in between 7:55 and 8:03 am, they will still be added to the appropriate SA RTD(s), but their name will not be highlighted. If by 8:04 am the agent has still not signed-in, they will be added to the appropriate SA RTDs, and the agent name field will be highlighted.

This approach to managing schedule deviations allows the user to define grace period which surround points in the schedule where deviations are anticipated, but still insures that proper notification (by highlighting the agent name field on the SA RTD) is given for deviations which occur during scheduled on and off-duty times. For example, if the agent is signed-in at 8:10 am, but then signs-out for an unscheduled break, the agent's state will be displayed as BREAK, and the agent's name will immediately be highlighted. Since 8:10 am is well within the agent's scheduled on-duty time, signing-out represents a significant schedule deviation, and, therefore, causes the agent's name to be highlighted immediately.

Acceptable schedule deviations vary based on the task type. For example, acceptable deviations are likely to be different for shift start/end times and break start/end times. What is deemed an acceptable schedule deviation may also vary from group to group. In order to handle these variations, early and late schedule adherence thresholds may be assigned to each task type by SAT group. For example, for SAT group 1, different early and late schedule adherence thresholds may be associated with each of the nine possible task types. The schedule adherence thresholds associated with each of these may be different than those defined for SAT group 2.

As previously indicated, the user may select the style of highlighting which will be applied to the agent name field of the SA RTD when a schedule deviation is detected. The user may define the following information:

Foreground color of the agent name field;

Background color of the agent name field; and

Display mode of the agent name field.

Foreground and background color may be set to any of the following: black, blue, cyan, green, magenta, red, white, or yellow. The display may blink, if desired. Once defined, the same highlighting is applied to all SA RTDs irrespective of group.

Figure 21:
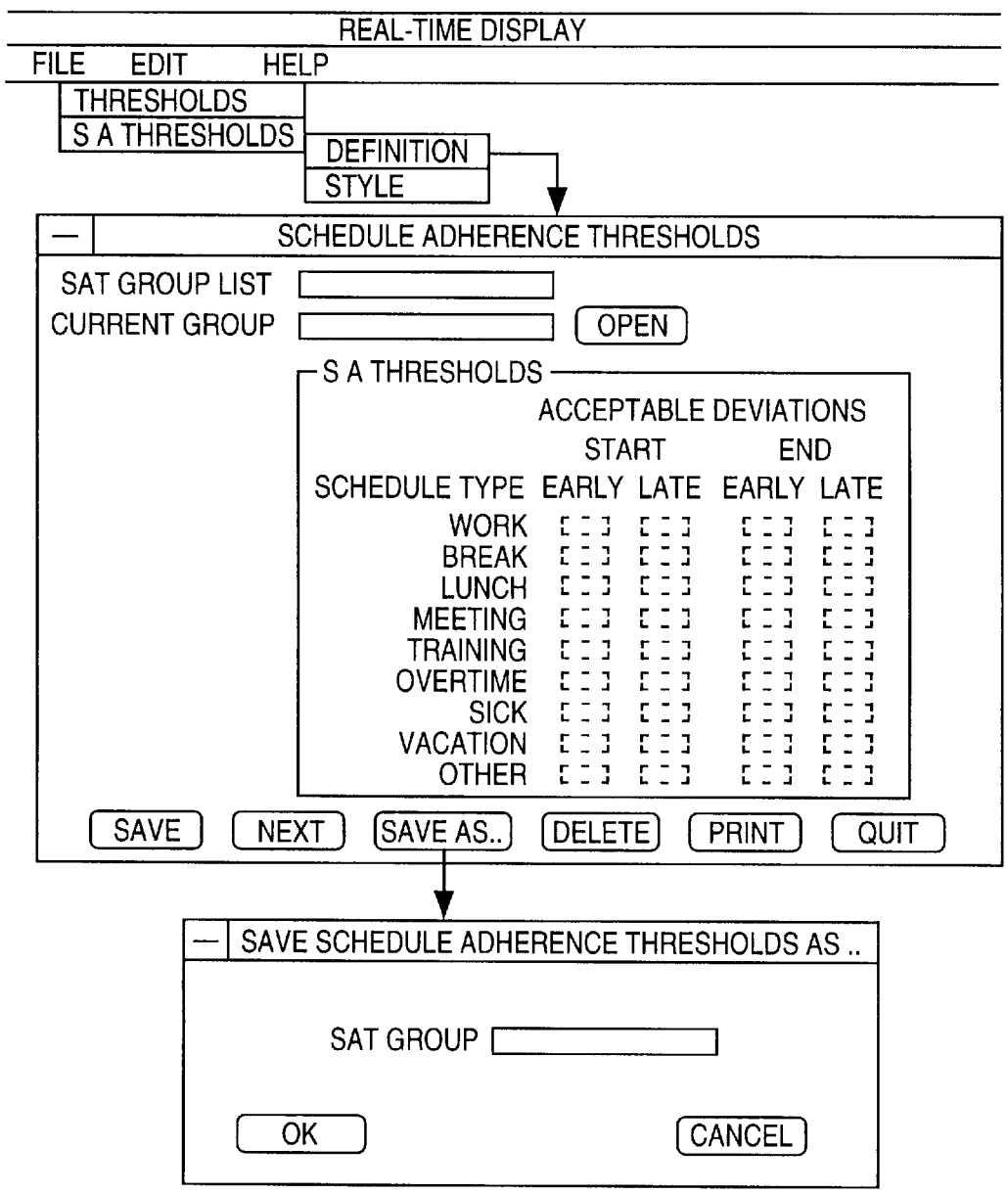
FIG. 21 is a plan view of a display for a schedule adherence threshold overview.

With reference to FIG. 21, in order to enter or modify a SAT group's schedule adherence thresholds, the user must first select SA Thresholds from the Edit menu in the RTD window. The user will be presented with the Schedule Adherence Thresholds dialog box, as shown in FIG. 22. The user identifies the SAT group of the thresholds by entering the SAT group number. Acceptable early and late thresholds (in minutes) may then be entered for each of the schedule entry types.

In order to select the style of highlighting which will be applied to the agent name fields of the SA RTD when a schedule deviation is detected, the user first selects Style from the SA Threshold submenu of the RTD window. Doing so will present the user with the Schedule Deviation Highlighting box, as shown in FIG. 25. This dialog box will display the current highlighting characteristics. The user may change both the foreground and background colors by clicking on the appropriate colored box. Display mode may also be selected via a set of check boxes. Selecting OK will save the highlighting information, while CANCEL will abandon any changes just entered by the user. A threshold value of 0 represents no grace period for an early or late threshold, making it an undesirable default value for thresholds. Thus, the initial (default) value for all early/late thresholds will be 5 minutes.

The early start threshold for any task cannot extend more than 2 hours into the previous day. If it does, SA will not recognize the threshold until approximately 2 hours before the end of day. At any given time, an internal schedule only contains 26 hours worth of schedule data (the entire next day plus 2 hours from the previous day). This internal schedule is rebuilt every day at approximately 2 hours before logging end-of-day. While this rebuilding process is occurring, threshold changes will not be accepted.

This feature is tightly coupled with the Schedule Adherence Real-Time Display and Agent Work Schedules. If an agent does not have a work schedule defined, then any schedule adherence thresholds which may apply to the agent's primary agent group or to the agent i-groups to which they belong will never be exceeded. In other words, the agent's name on the SA RTD will never be highlighted. If the agent does have a schedule, but no thresholds have been defined for the agent's primary agent group or the i-groups to which he or she belongs, then no "grace periods" will exist around schedule transition points. This will have the affect of highlighting the agent's name on SA RTDs whenever they deviate from their schedule for only a few seconds.

A "Sign-out with Reason" feature requires each agent to indicate a reason for signing-out. This feature may replace a single sign-out key, with a set of soft keys, one for each sign-out reason. Examples of possible sign-out reasons are END-WORK, BREAK, LUNCH, TRAINING, MEETING, SICK, PERSONAL, and VACATION. When the agent presses the soft-key associated with one of these sign-out reasons, the agent will be signed-out, and their status set to a state which reflects the sign-out reason. This feature provides some additional ways to monitor agent activity and detect exceptional conditions. Since the agent must sign-out with a reason, the single UNAVAIL state previously associated with a signed-out agent, may now be replaced with states which match the sign-out reason (BREAK,LUNCH, etc.). In order to take advantage of this additional information, agents will not be removed from the Schedule Adherence RTD unless they sign-out with a reason of END-WORK (which indicates the end of the work shift). Agents which have signed-out for other reasons, such as LUNCH or BREAK, will remain on the display and their sign-out state will appear in the current status field of the display. The current status field for the agent will reflect the reason of the last sign-out. This allows a supervisor, at a glance, to see the status of every agent scheduled to be working in a given group. Additionally, time-in-state thresholds may be set on these new sign-out states. This procedure provides a useful method of detecting unscheduled tasks which are of exceptionally long duration.

Thus, in accordance with then present invention, a program is provided for a computer which permits the definition of daily work schedules for a plurality of agents, compares the scheduled activities with the actual activities while providing the user with information to determine when an activity deviates from the schedule, and permits the user to define threshold limits for the schedule of the agents.

The foregoing detailed description has been given for clearness of understanding only, and no unnecessary limitation should be understood therefrom, as modifications will be obvious to those skilled in the art.

What is claimed is:

1. A schedule adherence system for a plurality of agents of a telephone system, comprising:

means for defining a work schedule for the agents;

means for determining an actual activity of the agents based upon a signed-in and signed-out status of the agents with the telephone system;

means for comparing in real time the actual activity of the agents with the work schedule; and means for indicating in real time when the actual activity of the agents varies from the work schedule.

2. A schedule adherence system for a plurality of agents of a telephone system:

means for defining a daily work schedule for the agents;

means for determining in real time an actual activity of the agents based upon a signed-in and signed-out status of the agents with the telephone system;

means for comparing in real time the actual activity of the agents with the work schedule;

means for defining threshold limits for the variance between the actual activity of the agents and the work schedule in real time; and means for indicating in real time when the variance between the actual activity and a the work schedule is an amount greater than said threshold limits.

3. The system of claim 2 including means for defining the work start times of the agents.

4. The system of claim 2 including means for defining the duration of a task for the agents.

5. The system of claim 2 wherein the indicating means comprises means for displaying information about the agents.

6. The system of claim 5 wherein the information is displayed in real time.

7. The system of claim 2 including means for selecting a set of agents for the indicating means.

8. The system of claim 2 including means for selecting a set of agents for the schedule defining means.

9. The system of claim 2 including means for modifying the defined schedule.

10. The system of claim 2 including means for modifying the threshold limits.

11. The system of claim 2 wherein the indicating means is selected on a day basis.

12. The system of claim 2 wherein the indicating means is selected on a weekly basis.

13. The system of claim 2 wherein the defining means defines a two week schedule.

14. The system of claim 1 wherein the schedule defining means comprises a current week and a next week schedule.

15. The system of claim 14 including means for replacing a current week schedule with a next week schedule, and replacing a next week schedule with a current week schedule.

16. The system of claim 2 wherein the schedule defining means includes a task name.

17. The system of claim 2 wherein the schedule defining means includes a task type.

18. The system of claim 2 including means for deleting information in the defined schedule.

19. The system of claim 2 including means for selecting an individual agent or agent group.

20. The system of claim 2 including means for highlighting information displayed by the indicating means responsive to an indication that a threshold limit has been exceeded.

21. The system of claim 2 wherein the threshold defining means establishes limits of early and late times for the agents.

22. The system of claim 2 including means for indicating an average call talk time of an agent.

23. The system of claim 2 including means for indicating an average call work time of an agent.

24. The system of claim 2 including means for indicating a number of calls handled by an agent.

25. The system of claim 2 including a pop-up display for indicating information about an agent.

26. The system of claim 2 including means for selecting one or more agents for the system.

27. The system of claim 26 including means for displaying information concerning one or more agents.

28. The system of claim 26 including means for entering information for one or more agents.

29. The system of claim 2 including means for determining and indicating more than one agent with the same or similar name.

30. The system of claim 2 including means for generating a report.

* * * * *